Patented Feb. 7, 1939

2,146,210

UNITED STATES PATENT OFFICE 2,146,210

SYNTHETIC RESINS

George De Witt Graves, Wilmington, Del., assignor to E. I. du Pont de Nemours & Company, Wilmington, Del., a corporation of Delaware No Drawing. Application November 4, 1936, Serial No. 109,182

11 Claims. (Cl. 260—23)

The invention herein described relates to synthetic resins and more particularly to new polyamides and to their preparation.

It is known that valuable polymeric products ranging in properties from crystalline solids to resinous products can be prepared from the reaction of diamines with certain dibasic acids. The reaction of diamines with monobasic acids, however, has been little studied and in reactions of this type which have been reported only monomeric products have been obtained. Thus, the reaction of acetic acid with ethylenediamine gives a crystalline salt which is not converted into a polymer by heating.

This invention, on the other hand, is concerned with polymeric materials of valuable properties obtained from polyamines and certain monobasic acids.

An object of this invention is to prepare new and valuable resins. A further object is to prepare water-insoluble polyamide resins having good solubility and compatibility characteristics. A still further object is to make polyamide resins that are useful in the preparation of sheeting materials, coating compositions, and molding compositions. Other objects will appear hereinafter.

These objects are accomplished by heating under polymerizing conditions a polyamine having at least two hydrogen-bearing amino groups with a monomeric acid of formula

(including amide-forming derivatives thereof) in which R represents hydrogen or a monovalent hydrocarbon radical, in such proportions that a water-insoluble product is formed.

I have found that valuable water-insoluble polymeric products can be obtained by reacting in the manner particularly pointed out below a polyamine, e. g., a diamine or triamine, with an unsaturated acid of formula CH₂=CRCOOH, in which R represents hydrogen or a monovalent hydrocarbon radical, or with an amide-forming derivative of said acid. Monoamines when reacted with these acids give monomeric products with which the present invention is not concerned.

The products of this invention are made by placing the unsaturated acid or an amide-forming derivative thereof and a polyamine having at least two hydrogen-bearing amino groups into a reaction vessel and heating the mixture to reaction temperature, usually 100°–300° C. and preferably 175°–275° C., until a resinous product of the desired properties is obtained. With certain of the amide-forming derivatives, e. g., the ester, the reaction may start at room temperature. The reaction is accompanied by the liberation of water if the unsaturated acid itself is used. On the other hand, if an amide-forming derivative of the unsaturated acid, such as the ester, anhydride, amide, or acid halide is used, the by-product may be alcohol, phenol, ammonia, or a hydrogen halide, depending upon the particular derivative selected. The course of the reaction can be followed in part by observing the quantity of by-product liberated and, also, by examining the nature of the non-volatile reaction product obtained. As the reaction progresses, the product changes from a liquid to a viscous liquid and then to a resinous product. If the reaction is carried out in a solvent, the viscosity of the solution increases as the reaction (polymerization) progresses. The time required to obtain a resinous product varies with the nature of the reactants used and the temperature employed; it may vary from a few hours to a few days. After heating, the product may be removed from the reactor either as such or by dissolving it in a suitable solvent. If the reaction has been carried out in the presence of a solvent, it can readily be poured or drained from the reactor. The product can be freed from solvent, either by evaporation of the latter or by pouring the solution into a non-solvent for the polymer which causes the latter to precipitate.

In order to obtain the most valuable products for use in coating compositions, etc., the polyamine and the unsaturated acid or derivative must be used in proportions which lead to the formation of water-insoluble products. In order to attain this object the reactants must be used in such proportions that the reactive amino and acid groups will be present in substantially equimolecular amounts. Thus, if a triamine (three hydrogen-bearing amino groups) is reacted with a methylene monocarboxylic acid or amide-forming derivative thereof, the preferred proportions would be one mol of triamine and three mols of unsaturated acid derivative. In other words, one mol of the triamine is chemically equivalent to three mols of the monobasic acid or amide-forming derivative in the process of this invention. Similarly, if a diamine is used, the ratio of amine to unsaturated acid should be approximately 1:2.

While I do not wish to commit myself with respect to the mechanism of the reaction by which the resinous products of this invention are obtained, it would appear that the principal reaction involved is the formation of an amide from the unsaturated acid and the polyamine and the polymerization of the resultant unsaturated amide. On this basis the reaction between methyl methacrylate and hexamethylene diamine might be visualized as follows:

(1) 

(A)

(2) $xA \xrightarrow{heat}$ polymer

It will be noted that product A contains two unsaturated groups, whereas a product similarly obtained from methyl methacrylate and a monoamine would contain but one unsaturated group, which probably accounts, in part at least, for the much greater ease with which Product A polymerizes than products obtained from methyl methacrylate and monoamines.

As mentioned above, the unsaturated acid must be of formula $CH_2=CRCOOH$ or an amide-forming derivative thereof. This does not mean that the acid used must be exclusively of this type. It is within the scope of this invention to use acids of this type in conjunction with polybasic acids, e. g., adipic acid, sebacic acid, maleic acid, fumaric acid, and diphenylolpropanediacetic acid. These polybasic acids may be added, if desired, in the form of salts with the polyamine. Thus, hexamethylene diammonium adipate, the salt derived from hexamethylenediamine and adipic acid, may be used in conjunction with the polyamine-alpha methylene monocarboxylic acid. The unsaturated acid ($CH_2=CRCOOH$) may also be used in the form of a salt with the polyamine. The salts undergo amide-formation on heating, usually above 150° C. Furthermore, it is possible to use monobasic acids either saturated or unsaturated in admixture with the alpha-methylene monocarboxylic acid; in fact, very valuable products are obtained by using drying oils or drying oil acids in conjunction with the alpha-methylene monocarboxylic acid and the polyamine. Mixtures of acids of formula $CH_2=CRCOOH$ or amide-forming derivatives thereof can also be used. As an example might be mentioned the reaction of a polyamine with a mixture of methyl acrylate and ethyl methacrylate.

The polyamines used in this invention must contain at least two hydrogen-bearing amino groups, i. e., primary or secondary amino groups. It is desirable that the polyamine contain at least two primary amino groups since primary amino groups undergo amide-formation much more readily than do secondary amino groups. The term "polyamine" is used to designate compounds containing at least two hydrogen-bearing amino groups; it includes diamines, triamines, as well as higher amines, e. g., triethylene-tetramine. The polyamines may be used either alone or in conjunction with other polyamines or monoamines.

The products of this invention are polymeric in character. For the most part they are resins whose softening point and solubility are dependent upon the reactants used in their preparation, and on the temperature employed. In general, the products are light-colored and are soluble in alcohol, esters, and hydroxy ethers. They are insoluble in water. They can be formed into transparent films, sheets, foils, ribbons, and the like. Resins made with the use of drying oil derivatives yield films which have particularly good hardness, toughness, and flexibility. These properties make the products especially useful in the preparation of coating compositions.

The following examples, in which the parts are by weight, illustrate the invention. Monomeric methyl methacrylate is used in these examples as a typical representative of the alpha-methylene monocarboxylic acids and their amide-forming derivatives.

EXAMPLE I

*Methyl methacrylate and hydrazine*

A reaction vessel containing a mixture of 30 parts of methyl methacrylate and 9.6 parts of an aqueous hydrazine solution which contained 4.8 parts of hydrazine was fitted with a reflux condenser and heated for 94 hours in a bath at 150°–200° C. The product at this stage was a colorless syrup of low viscosity. It was heated for three hours at 200° C., allowing volatile material to distill out and finally heated four hours in a vacuum oven (26-27 inch vacuum) at 110° C. The final product was a light yellow (nearly colorless), soft, rubbery resin which softened at about 20° C. It was soluble in dioxan, formamide, and dilute acetic acid, but insoluble in water.

EXAMPLE II

*Methyl methacrylate and diaminoisopropanol in solution*

A solution of 60 parts of methyl methacrylate and 27 parts of 1,3-diamonopropanol-2 in 50 parts of the monoethyl ether of ethylene glycol was heated in a reaction vessel provided with a reflux condenser for 18 hours in a bath at 100°–125° C. and 55 hours at 150°–180° C. At the end of this time it was heated 16 hours at 110° C. under a 26-27 inch vacuum to remove any volatile material. The product was a light yellow, brittle resin which softened at 135°–140° C. and was insoluble in the common lacquer solvents but soluble in dilute alkali. A product prepared somewhat similarly using 3 mols of methyl methacrylate and one mol of diaminoisopropanol had a softening temperature of about 60° C.

EXAMPLE III

*Methyl methacrylate and diethylenetriamine in solution*

A solution of 60 parts of methyl methacrylate and 20.6 parts of diethylenetriamine in 50 parts of dioxan was heated under a reflux condenser for 18 hours in a bath at 100°–125° C. and 55 hours at 150°–180° C. The solvent was removed by heating overnight in a vacuum oven at 110° C. The product was a brittle amber resin which softened at 30°–35° C. and was soluble in alcohols and in dilute alkali and acid. A film cast from its solution in dioxan and baked at 100° C. was transparent, brown, hard, and unaffected by hot water.

EXAMPLE IV

*Methyl methacrylate and decamethylenediamine*

A mixture of five parts of methyl methacrylate and 4.3 parts of decamethylenediamine was refluxed 64 hours in a bath at 120° C. The temperature was then allowed to rise to 180° C. during a period of two hours and the volatile products were distilled off. The product was an amber-colored, water-insoluble, rubber-like resin. Films cast from a solution of the resin in a mixture of acetone, methanol and toluene, and baked at 100° C. were clear transparent and tough and showed good adhesion to glass.

Example V

Methyl methacrylate, linseed oil acids, and ethylenediamine

A mixture of 40 parts of methyl methacrylate, 28.8 parts of linseed oil acids, and 15 parts of ethylenediamine was heated under a reflux condenser for 94 hours in a bath at 150°–200° C. The viscous syrup which was obtained was heated four hours at 110° C. under a 26-inch vacuum to remove any volatile material. The product was a clear, light-amber gum which softened at 13°–18° C. and was soluble in a wide variety of solvents including alcohols, hydrocarbons and esters. Films of the product cast from an ethanol solution and baked at 100° C. were hard, transparent, and unaffected by water.

The examples illustrate the preparation of resinous products from various polyamines and methyl methacrylate. As already indicated, other unsaturated acids of formula $CH_2=CRCOOH$ or amide-forming derivatives thereof, may be used in place of methyl methacrylate. As examples of such derivatives might be mentioned acrylic acid, methyl acrylate, ethyl acrylate, butyl acrylate, acrylic acid anhydride, methacrylic acid, ethyl methacrylate, butyl methacrylate, and phenyl acrylate. Less preferred derivatives include such materials as alpha-ethyl acrylic acid, and alpha-phenyl acrylic acid (atropic acid). As additional examples of polyamines which may be used with the above acids may be mentioned tetramethylenediamine, pentamethylenediamine, hexamethylenediamine, p-xylylenediamine, heptamethylenediamine, beta, beta'-diaminodiethyl ether, triethylenetetramine, piperazine, and tetramethyl piperazine. Monoamines, e. g., methylamine, diethylamine, laurylamine, etc., may be used in conjunction with the polyamine.

Examples II and III illustrate the use of a solvent in the preparation of the products of this invention, the solvents employed being ethers. Ethers are very useful for this purpose, but other classes of compounds which are inert toward the reactants and reaction product may also be used. Alcohols, ketones, esters, and in some cases phenols can be used as solvents in the reaction. When it is desired to use the reaction product directly in the preparation of a coating composition, it is desirable to select a solvent which can be used in the coating composition, i. e., a solvent which can be volatilized without too much difficulty. It is within the scope of this invention to prepare the polyamine-unsaturated acid condensation products in the presence of diluents which are solvents for the reactant, but not for the reaction product. This method is often a convenient method for securing intimate mixtures of the reactants and, at the same time, avoiding the necessity for separating the reaction product from a solvent. The products of this invention can be prepared in the presence of other materials, e. g., film-forming materials, such as resins, cellulose derivatives, drying oils, pigments, and fillers.

Example V illustrates the preparation of a linseed oil modified polyamine-unsaturated acid condensation product. Examples of other oils or acids thereof which may be used in place of linseed oil are China-wood oil, oiticica oil, fish oil, perilla oil, soya bean oil, sunflower oil, and castor oil. Resins and resin acids, such as congo and rosin, may also be used. The products of this invention can also be prepared in the presence of various polymerizable materials such as vinyl chloride and methyl vinyl ketone.

The products illustrated in the examples were prepared in open reactors at atmospheric pressure. In some cases it is desirable in order to secure light-colored products to carry out the reaction in the absence of oxygen. This may be done by using closed reactors from which the air has been excluded or by blanketing the reaction mixture with an inert gas, such as nitrogen. The reaction can be carried out at ordinary, sub-atmospheric, or super-atmospheric pressure. Agitation of the reaction mixture is often desirable, since it insures thorough mixing of the reactants and prevents local superheating. In general, no catalysts are needed in the reaction. In some cases, however, it is advantageous to add a polymerizing catalyst, such as ozone, benzoyl peroxide, sulfur dioxide, oxidized pinene, or the like, to hasten the conversion to the resinous state. When this is done, it is usually desirable to add the catalyst after the reaction has started in order to prevent polymerization of the acrylic acid derivative before it has reacted with the polyamine. Inorganic materials of alkaline reaction, such as oxides and carbonates, and acidic materials, such as halogen salts of polyvalent metals, e. g., aluminum, zinc, or tin, are sometimes helpful in increasing the rate of reaction between the unsaturated acid and the polyamine.

It is to be observed that the reaction by which the products of this invention are produced differs from the reaction of alpha-methylene monocarboxylic acids or amide-forming derivatives thereof with monoamines in that resinous products are obtained by the process described herein. Moreover, the products of this invention are different, particularly in their solubility characteristics, from those obtained by reacting polymers of alpha-methylene mono-carboxylic acid with polyamines. Products obtained by this latter method are insoluble and infusible.

This invention provides a simple and inexpensive method for the preparation of new and valuable resinous products. The nature of the reaction by which these products are formed is such that resins of widely different properties can be produced depending upon the reactants selected and the proportions in which they are used. Depending upon their properties, these products are useful in coating, plastic, molding, sizing, impregnating, adhesive, and related arts. In these various applications the products may be mixed with one another or with other agents, such as plasticizers, resins, cellulose derivatives, pigments, fillers, dyes, and the like. The products are also useful in the preparation of transparent sheets, films, foils, and the like.

As many apparently widely different embodiments of this invention may be made without departing from the spirit and scope thereof, it is to be understood that I do not limit myself to the specific embodiments thereof except as defined in the appended claims.

I claim:

1. A process which comprises heating under polymerizing conditions reacting ingredients consisting essentially of substantially chemically equivalent amounts of a polyamine having at least two hydrogen-bearing amino groups attached to aliphatic carbon atoms, and a substance of the class consisting of monomeric acids of the formula $CH_2=CRCOOH$ and amide-forming derivatives of such acids, R in said formula representing hydrogen or a monovalent hydrocarbon radical.

2. The process set forth in claim 1 in which said heating is at a temperature of from 100° to 300° C.

3. A process which comprises heating at a temperature of from 100° C. to 300° C. under polymerizing conditions in the presence of a diluent which is a solvent for the reaction product reacting ingredients consisting essentially of substantially chemically equivalent amounts of a polyamine having at least two hydrogen-bearing amino groups attached to aliphatic carbon atoms, and a substance of the class consisting of monomeric acids of the formula $CH_2=CRCOOH$ and amide-forming derivatives of such acids, R in said formula representing hydrogen or a monovalent hydrocarbon radical.

4. The process set forth in claim 1 in which said polyamine contains at least two primary amino groups.

5. The process set forth in claim 1 in which said substance is methyl methacrylate.

6. A process which comprises reacting with heat treatment under polymerizing conditions in the presence of a fatty substance of the class consisting of fatty oils and fatty oil acids, reacting ingredients consisting essentially of substantial amounts of a polyamine having at least two hydrogen-bearing amino groups attached to aliphatic carbon atoms, and a substance of the class consisting of monomeric acids of the formula $CH_2=CRCOOH$ and amide-forming derivatives of such acids, R in said formula representing hydrogen or a monovalent hydrocarbon radical, said reactants being used in such proportion that the reactive amino and acid groups are present in substantially chemically equivalent proportions.

7. A water-insoluble reaction product of reacting ingredients consisting essentially of substantially chemically equivalent amounts of a polyamine having at least two hydrogen-bearing amino groups attached to aliphatic carbon atoms, and a substance of the class consisting of monomeric acids of the formula $CH_2=CRCOOH$ and amide-forming derivatives of such acids, R in said formula representing hydrogen or a monovalent hydrocarbon radical.

8. A water-insoluble, resinous reaction product of reacting ingredients consisting essentially of substantially chemically equivalent amounts of a polyamine having at least two primary amino groups attached to aliphatic carbon atoms, and a substance of the class consisting of monomeric acids of the formula $CH_2=CRCOOH$ and amide-forming derivatives of such acids, R in said formula representing hydrogen or a monovalent hydrocarbon radical.

9. The product set forth in claim 8 in which said substance is an amide-forming derivative of methacrylic acid.

10. The product set forth in claim 8 in which said substance is methyl methacrylate.

11. The reaction product of ingredients containing reactive amino and acid groups in substantially chemically equivalent amounts, said ingredients consisting essentially of a substance of the class consisting of fatty oils and fatty oil acids, a polyamine having at least two hydrogen-bearing amino groups attached to aliphatic carbon atoms, and a substance of the class consisting of monomeric acids of the formula $CH_2=CRCOOH$ and amide-forming derivatives of such acids, R in said formula representing hydrogen or a monovalent hydrocarbon radical.

GEORGE DE WITT GRAVES.